United States Patent
Ohara

(10) Patent No.: US 8,484,423 B2
(45) Date of Patent: Jul. 9, 2013

(54) METHOD AND APPARATUS FOR CONTROLLING CACHE USING TRANSACTION FLAGS

(75) Inventor: Moriyoshi Ohara, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 456 days.

(21) Appl. No.: 12/814,532

(22) Filed: Jun. 14, 2010

(65) Prior Publication Data

US 2010/0325361 A1  Dec. 23, 2010

(30) Foreign Application Priority Data

Jun. 23, 2009  (JP) .................................. 2009-148309

(51) Int. Cl.
*G06F 12/00*  (2006.01)
(52) U.S. Cl.
USPC .......................................... 711/144; 711/135
(58) Field of Classification Search
USPC .......................................... 711/133, 135, 144
See application file for complete search history.

(56) References Cited

U.S. PATENT DOCUMENTS 6,546,473 B2 *  4/2003  Cherkasova et al. .......... 711/158
2006/0101208 A1  5/2006  Kottapalli

FOREIGN PATENT DOCUMENTS

| JP | 09-101916 A | 4/1984 |
|---|---|---|
| JP | 59-160251 A | 9/1984 |
| JP | 05-216765 A | 8/1993 |
| JP | 11-112564 A | 4/1999 |
| JP | 11-259362 A | 9/1999 |
| JP | 2001-290704 A | 10/2001 |
| JP | 2002-132554 A | 5/2002 |
| JP | 2002-244869 A | 8/2002 |
| JP | 2005-196303 A | 7/2005 |
| JP | 2006-127362 A | 5/2006 |
| WO | WO 2006/112111 | 10/2006 |

OTHER PUBLICATIONS

Wang, et al., "Using the Compiler to Improve Cache Replacement Decisions," Proceedings of the 2002 Int'l Conf. on Parallel Architectures & Compilation Techniques, p. 199, 2002.

* cited by examiner

*Primary Examiner* — Kalpit Parikh
(74) *Attorney, Agent, or Firm* — Cantor Colburn LLP; Dwayne Nelson

(57) ABSTRACT

A computer-implemented method, apparatus, and computer program-product for controlling cache. The method includes the steps of assigning a value corresponding to a transaction to a memory object that is created while a computer application is processing the transaction; adding the assigned value as a transaction flag value to a flag area of a cache array in accordance with the storage of the memory object in the cache; registering the corresponding transaction flag value as a victim candidate at the completion of the transaction; and in response to eviction of a cache line, preferentially evicting a cache line having the transaction flag value registered as the victim candidate.

6 Claims, 7 Drawing Sheets

FIG. 7

Request-URI = "*" | absoluteURI | abs_path | authority

FIG. 8

```
Method      = "OPTIONS"
            | "GET"
            | "HEAD"
            | "POST"
            | "PUT"
            | "DELETE"
            | "TRACE"
            | "CONNECT"
            | extension-method
extension-method = token
```

METHOD AND APPARATUS FOR CONTROLLING CACHE USING TRANSACTION FLAGS

CROSS-REFERENCE TO RELATED APPLICATIONS

This application claims priority under 35 U.S.C. §119 to Japanese Patent Application No. 2009-148309 filed Jun. 23, 2009, the entire contents of which are incorporated by reference herein.

BACKGROUND OF THE INVENTION

1. Field of the Invention

The present invention relates to cache control, and in particular, to cache control connected to computer applications.

2. Description of the Related Art

For instruction codes that are stored in a main memory, part of the frequently executed instruction code is stored in a cache memory, which reduces an access count to a slow-operating main memory and improves high-speed processing.

However, known caches have not been controlled in accordance with the operations of applications. To increase processor frequency and to meet a demand for high performance, a need for making effective use of the computer processor's cache memory has been recently increasing. In particular, when a commercial application (e.g. web application) server processes a client request, it often creates memory objects that are used only in a specific request process and that become unused after completion of the process. With such a memory access pattern, the use of a normal LRU algorithm (evicting the least recently used data items into a memory) causes unnecessary data to be left in a cache after completion of a transaction process, which hinders effective use of the cache memory.

A known cache memory system in the related art allows software to control the operation aggressively (see PCT International Publication No. WO 2006/112111). According to this system, an attribute control means causes a cache memory to execute a predetermined operation as a processor executes a predetermined instruction. However, this system does not perform cache control based on the operation of an application, which hinders efficient cache control in an application server that repeats creation and deletion of memory objects.

A method in the related art is a method for estimating a memory reuse distance per cache line with a compiler (see Zhenlin Wang, Kathryn S. McKinley, Arnold L. Rosenberg, Charles C. Weems, "Using the Compiler to Improve Cache Replacement Decisions," Proceedings of the 2002 International Conference on Parallel Architectures and Compilation Techniques, p. 199, Sep. 22-25, 2002). At the first access (last use) of an access having a long reuse distance, the CPU writes information of the reuse distance in the tag bit of a cache line. Therefore, the compiler generates a special load/store instruction to write a tag value in advance as an instruction to execute a memory access. When there is a need for evicting a line from the cache, the cache selects a line having a long reuse distance as a victim candidate, with priority, using the tag value. This allows lines that should be evicted before reuse to be evicted aggressively and lines other than those to be held as much as possible. This method depends on the estimation of a reuse distance by the compiler. However, existing commercial servers generally process a plurality of tasks in parallel, and the reuse distance greatly changes with combinations of tasks processed at the same time during execution, which makes the estimation by the compiler extremely difficult.

Another related art is a prefetch instruction installed in Intel processors or the like (see published patent application US 2006/0101208 A1). When prefetch is performed using this instruction, a flag is put on a corresponding line in a cache. With this flag on, the line is not stored in a lower layer cache when evicted, which can therefore avoid contamination of the lower layer cache. However, according to this method, if the total amount of short-life data exceeds the cache size, a cache miss to access a main memory frequently occurs.

Thus, since the methods of the foregoing related art do not involve cache control based on the operation of applications, an improvement in performance of commercial servers, such as web application servers, is needed.

SUMMARY OF THE INVENTION

According to an aspect of the present invention, a method for controlling a cache includes the steps of: assigning a value corresponding to a transaction to a memory object that is created while a computer application is processing the transaction; adding the assigned value as a transaction flag value to a flag area of a cache array in accordance with the storage of the memory object in the cache; registering the corresponding transaction flag value of a victim candidate at the completion of the transaction; and in response to eviction of a cache line, preferentially evicting a cache line having the transaction flag value registered as the victim candidate.

According to another aspect of the present invention, an apparatus for controlling a cache includes: a value assigning unit for assigning a value corresponding to a transaction to a memory object that is created while a computer application is processing the transaction; a value adding unit for adding the assigned value as a transaction flag value to a flag area of a cache array in accordance with the storage of the memory object in the cache; a registering unit for registering the corresponding transaction flag value of a victim candidate at the completion of the transaction; and in response to eviction of a cache line, a cache line evicting unit for preferentially evicting a cache line having the transaction flag value registered as the victim candidate.

According to yet another aspect of the present invention, a computer program product is provided for controlling a cache. The computer program product includes computer program instructions stored on a computer readable storage medium. When the instructions are executed, a computer will perform the steps of the method.

BRIEF DESCRIPTION OF THE DRAWINGS

FIG. 7 is a diagram showing an example of a URI that can be implemented according to embodiments of the present invention.

FIG. 8 is a diagram showing typical eight methods of an HTTP protocol that can be implemented according embodiments of the present invention.

DETAILED DESCRIPTION OF PREFERRED EMBODIMENTS

Outline of Operation

A commercial application server processes a plurality of transactions in parallel by time-sharing with a plurality of CPUs. However, after completion of the process, most of memory objects created during the transactions are not used. Accordingly, in the embodiments of the present invention, each memory object created during a transaction is given a transaction flag value corresponding to the transaction. After completion of the transaction, the corresponding transaction flag value is registered as an identifier of a victim candidate. When the cache evicts a cache line, the cache preferentially selects a cache line having the transaction flag value registered as a victim candidate. This can reduce the influence of contamination in the cache due to memory objects that have a low probability of reuse in the future. Embodiments of the present invention will be specifically described hereinbelow with reference to the attached drawings. Note that the description is provided for the case of one CPU for the purpose of simplification but transactions are processed by multiple CPUs.

System Configuration

Figure 1:
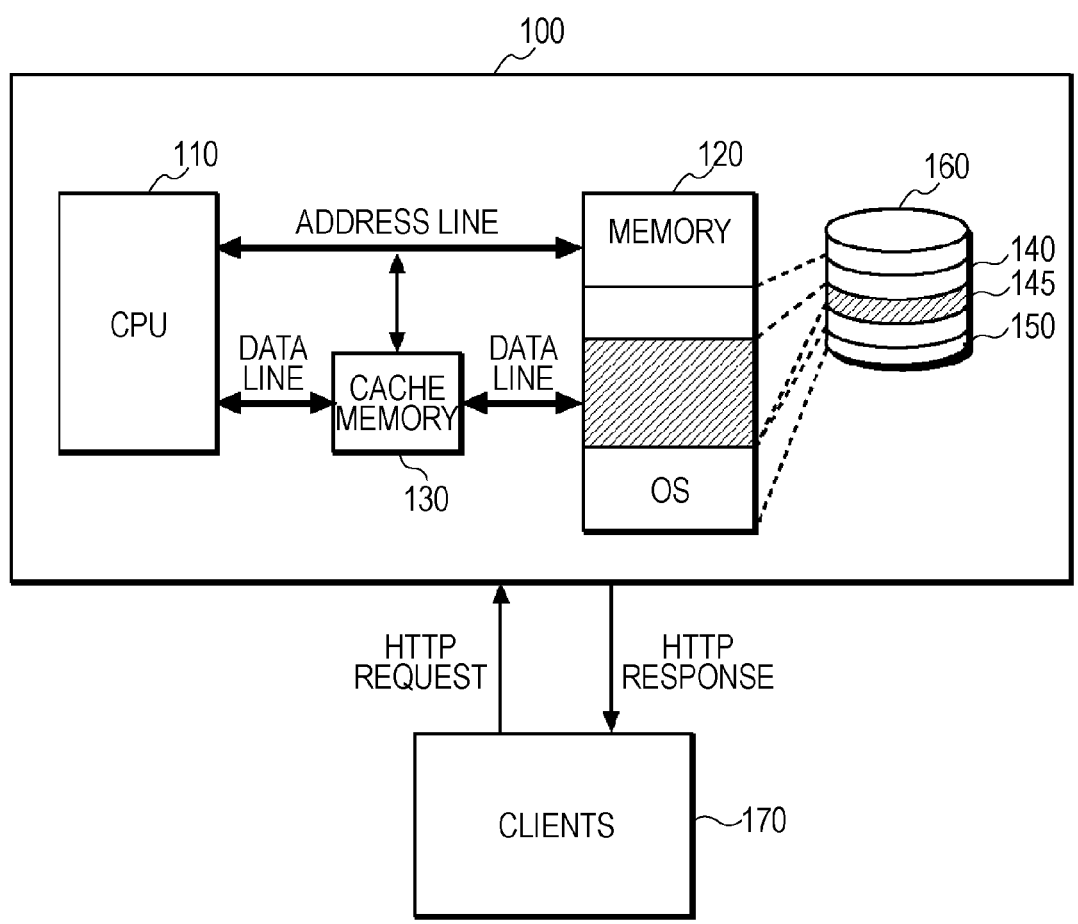
FIG. 1 is a diagram for describing the outline of cache control according to an embodiment of the present invention.

Referring to FIG. 1, a diagram describes the outline of cache control according to an embodiment of the present invention. A system 100 is a computer having a cache according to the embodiment of the present invention, and preferably, an application server that processes a plurality of transactions. The system 100 includes a CPU 110 and a memory 120 and a cache 130 connected thereto. The memory 120 principally refers to a main memory but can also be a virtual memory including an external storage unit 160. Program code of an OS 150 and an application 140 that operate thereon is also finally placed in the main memory 120 and is fetched to the CPU 110, where it is translated and executed. The CPU 110, the memory 120, and the cache 130 are connected with an address line and a data line, respectively.

Figure 2:
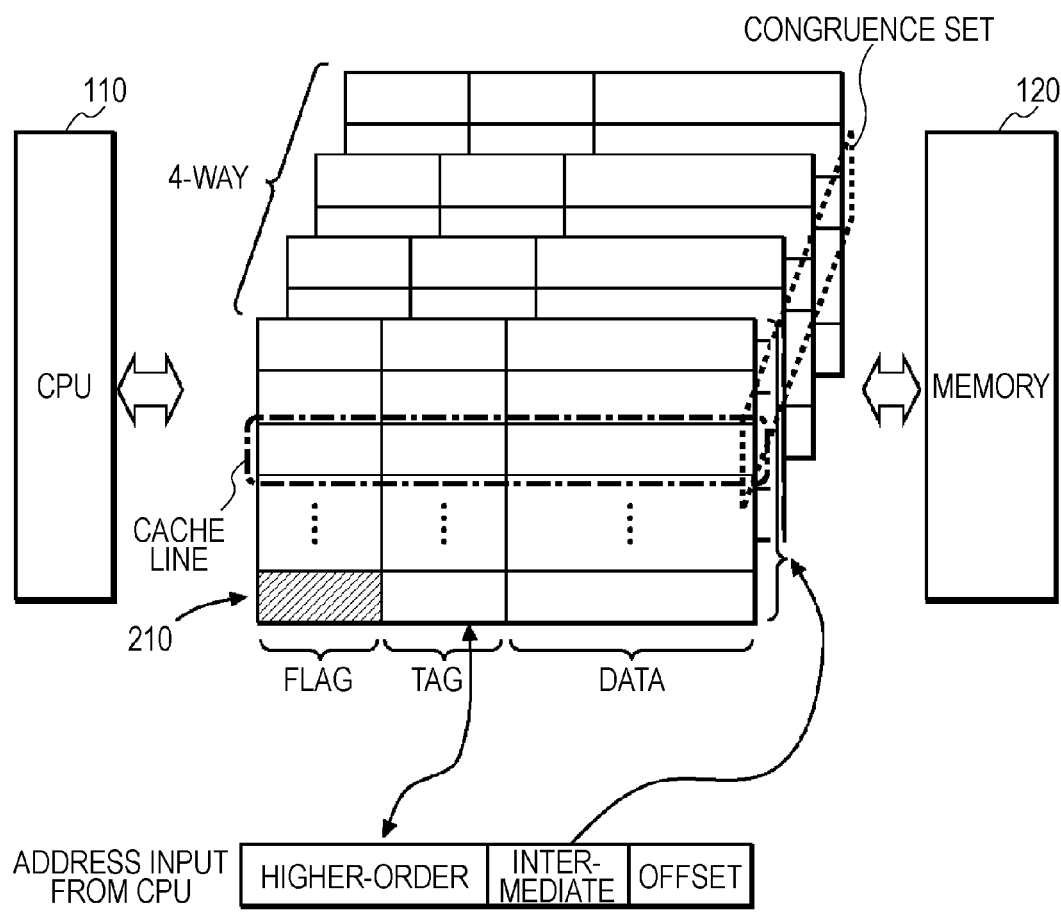
FIG. 2 shows the configuration of a 4-way set associative cache according to embodiments of the present invention.

FIG. 2 shows the configuration of the cache 130. The following describes an example configuration of a 4-way set associative cache but the embodiment of the present invention is not limited to this configuration. Since the circuit configuration of the 4-way set associative cache is well known, a high-level principle of the operation will be described. This system divides the cache into 4 sets to store a plurality of tags and data items that correspond to one index. First, when an address is received as input from the CPU 120, the input address is divided into three, higher-order, intermediate, and lower-order (offset) addresses. The higher-order address corresponds to a tag array of the cache (hereinafter abbreviated to tags). The intermediate address is used as an index to select a cache line. The lower-order offset corresponds to the location of a word to be accessed in the cache line. In the example of the POWER processor, the offset of the lower-order address of a cache line with a data length (that is, line length) of 128 byte (1,024 bits) is the offset of words in the line. If data corresponding to an input address exists in the cache (cache hit), the cache transmits the data to the CPU 110. The embodiment of the present invention can include a flag 210 of one cache line having a flag area, a tag, and data.

Figure 3:
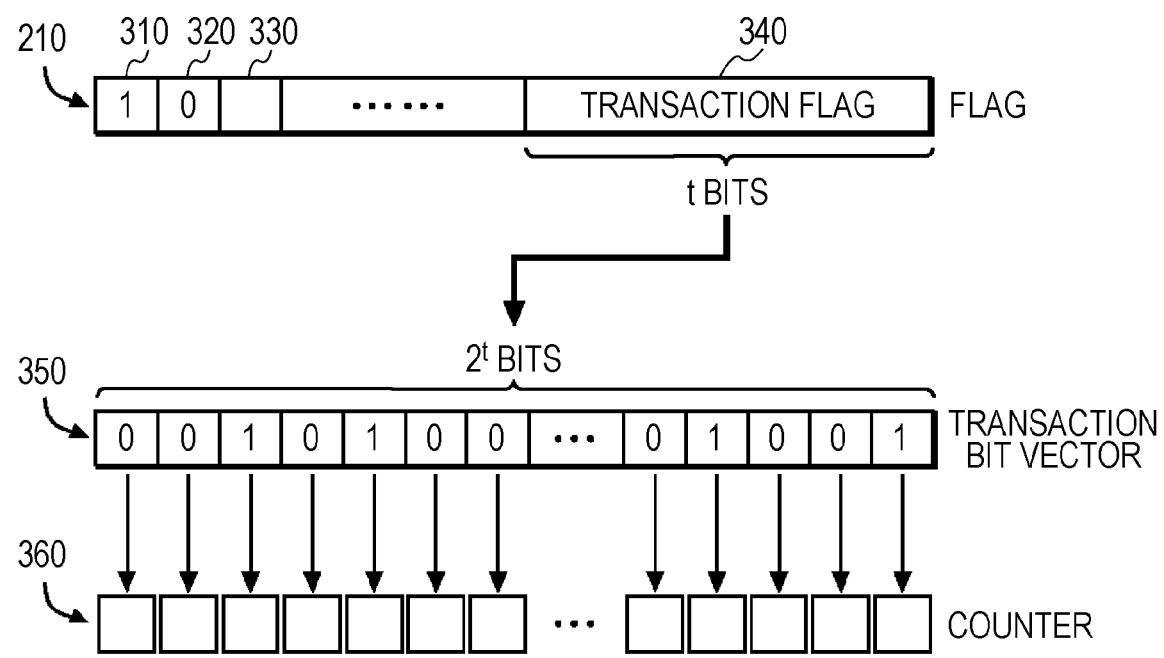
FIG. 3 is a diagram illustrating the details of a flag according to embodiments of the present invention.

FIG. 3 illustrates the details of the flag 210, showing typical bits of the flag 210. A valid flag 310 is set when data is read from a main memory. A dirty flag 320 is set in the case where there is a need to write back data to the memory 120 before the data is deleted from the cache. LRU management information 330 has LRU information, which includes information about access order in each congruence set or information equal thereto. For example, a 4-way set associative cache may store the order of access to four members. The embodiment of the present invention also has a transaction flag 340 (t bits) in this flag area. The transaction flag 340 has information corresponding to a transaction to be processed by the application 140—that is, this allows $2^t$ transactions to be identified. To manage cache operation of the individual transactions, the flag area further includes one transaction bit vector 350 having a $2^t$-bit length (this size corresponds to the number of values that the transaction flag value can take) and $2^t$-bit counters 360 corresponding to the individual transaction bits. The counter length depends on the cache size. The counters 360 can count the total line numbers in the cache 130 at the maximum. For example, for a 256 KB cache with a line size of 128 bytes, the number of lines is 2,048. Thus, 11-bit counters are provided. In the embodiment of the present invention, t=10; however, the invention is not limited thereto.

The individual bits of the transaction bit vector 350 indicate whether cache lines having the corresponding individual transaction flag value are registered as victim candidates (1: registered, and 0: unregistered). The counter 360 indicates the number of valid cache lines having the corresponding transaction flag value. When the value of the counter 360 becomes zero or smaller than a predetermined threshold value, the corresponding transaction flag value indicates a candidate to be used for a new transaction. However, a transaction flag value 0 is used for normal data (data effective for the LRU system) and is not registered as a victim candidate. Therefore, a transaction bit vector and a counter having the transaction flag value 0 can be omitted.

Operation of Application Server

The operation of the application server 100 will be described hereinafter in more detail. In the application server 100, the programs of the application 140 and the OS 150 stored in the external storage unit 160 are read into the main memory 120 and are executed by the CPU 110. The application server 100 is a server for performing HTTP communication via a network and receives an HTTP request from a client 170. The program of the application 140 processes the request as a transaction. During the process, a large number of memory objects are created in the memory 120 by a memory management library 145. Data on these memory objects are transferred among the CPU 110, the cache 130, and the memory 120. After completion of the transaction process, the result is returned to the client 170 as an HTTP response. A large number of memory objects become unnecessary and are to be discarded.

Figure 4:
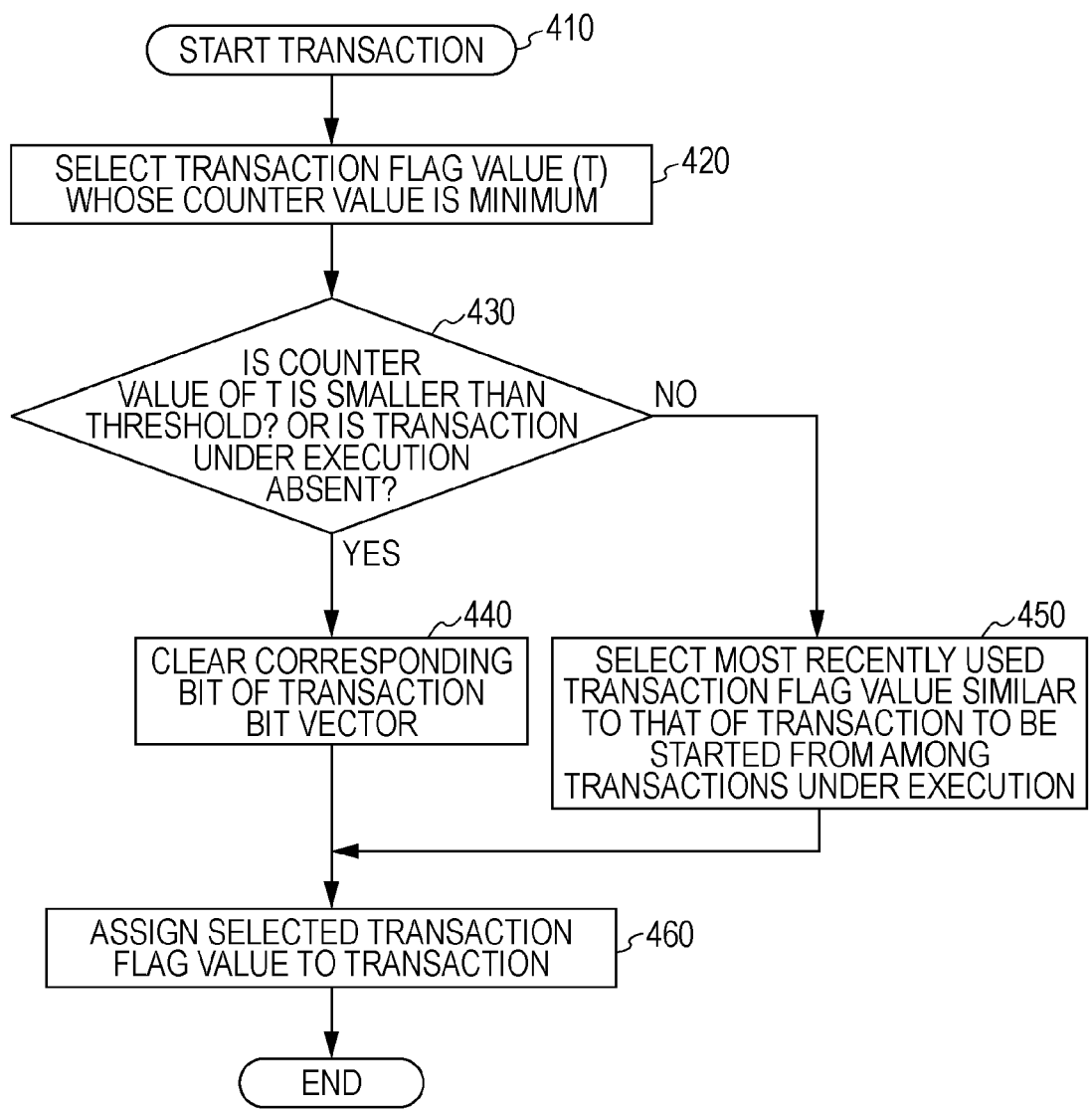
FIG. 4 is a diagram showing the flow of selecting a transaction flag value according to embodiments of the present invention.

FIG. 4 is a diagram showing the flow of selecting a transaction flag value. In step S410, a transaction begins. In step S420, a transaction flag value which is other than 0 and whose the counter indicates zero (not used in the lines in the cache) is selected, or a transaction flag value whose counter indicates a value smaller than a predetermined threshold value (the number of lines used in the cache is sufficiently small) is selected. If there is not such a transaction flag value, a recently selected transaction flag value similar to a transaction to be executed at present is selected. "Similar" refers to, for example, combinations of the uniform resource identifier (URI) of an HTTP request and a method thereof.

A URI for indicating a resource to which an HTTP request is applied is referred to as "Request-URI". FIG. 7 shows an example of the URI. The URI identifies a resource to which an HTTP request is applied. Four options in Request-URI in FIG. 7 depend on the characteristics of the request. "Method" is used in combination with Request-URI to select a behavior for a resource designated by the URI. There are eight methods. The eight methods are shown in FIG. 8. Transactions having the same combination of URI and a method thereof are defined as similar transactions. In this case, the two transactions are handled as a single transaction in terms of tag management. Such processing can make the range of the transaction flag values smaller than the number of transactions that can be present in the cache at the same time. In other words, the bits of the transaction flag can be reduced. If a transaction bit vector corresponding to a selected transaction flag value is set (the identifier of a victim candidate), the registration as a victim candidate is cleared. In other words, the bit of the corresponding transaction bit vector is cleared to zero. In this way, the application assigns a transaction flag value to a transaction to be started.

Figure 5:
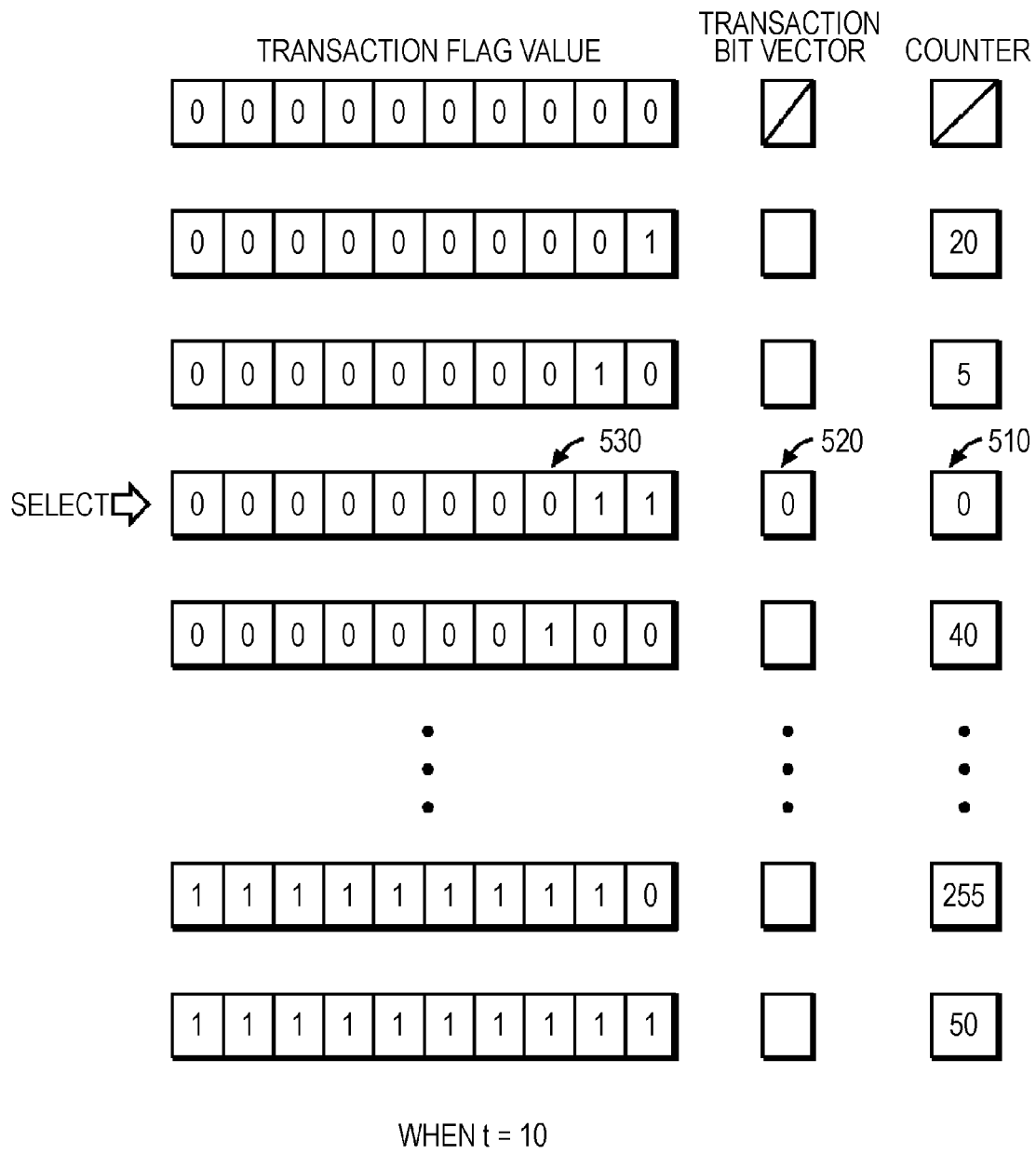
FIG. 5 is a diagram showing a concrete example of assigning a transaction flag value to a transaction to be started according to embodiments of the present invention.

FIG. 5 shows a concrete example of assigning a transaction flag value to a transaction to be started. FIG. 5 illustrates a case in which t=10 (1,024 flag values). In this case, since the value of the counter 510 is 0, a transaction flag value of 530 ("0000000011"=3) is the transaction flag value of the transaction. At the same time, the bit of the corresponding transaction bit vector is set to zero.

Creation of Object

When creating a memory object, the memory management library 145 fetches or prefetches a corresponding memory area. At that time, a transaction flag value <T> assigned to the transaction is added to a corresponding line in the cache. For example, if an address input from the CPU 110 is <address>, the following prefetch instruction is used:

Tprefetch <address>, <T>

However, if the created object is assumed to be used across transactions, no transaction flag is added (or the transaction flag value is set to zero). In other words, the created object is not registered as a victim candidate at the completion of the transaction. For normal memory access and prefetch other than the creation of a memory object, an instruction without a transaction flag is used. In this case, cache hardware handles it as an access with a transaction flag value 0. If the line is present in the cache (hit), the transaction flag value does not change. If a memory fetch due to a cache miss occurs, 0 is added to the cache line as a transaction flag value. In other words, it is regarded as a long-life object. However, even normal memory access or prefetch can be performed using an instruction with a transaction flag when it is assumed not to be used across transactions.

Completion of Transaction

Upon completion of the transaction, the transaction flag value <T> is registered in the cache memory as a victim candidate. For example, the following instruction is used:

Transient <T>

This instruction sets a victim candidate flag (a bit in a corresponding transaction bit vector) corresponding to a transaction flag value taken as an argument.

Operation of Cache

Figure 6:
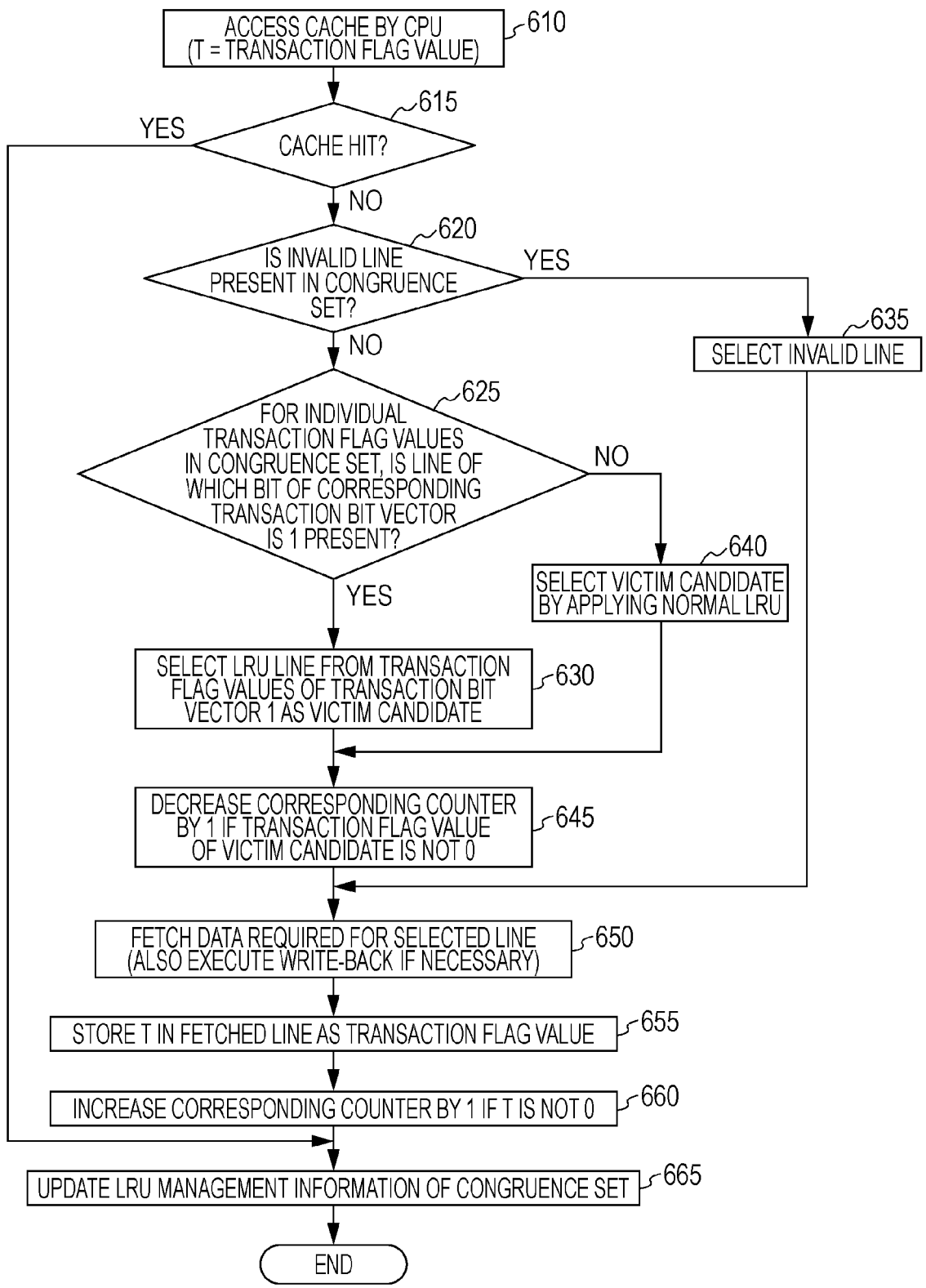
FIG. 6 is a diagram showing an example of the operation of cache hardware according to embodiments of the present invention.

FIG. 6 shows the operation of cache hardware. In step S610, it is assumed that the CPU 110 accesses the cache. If a cache hit occurs in step S615, the same operation as that of a known cache is performed, and the process proceeds to step S665. If a cache miss occurs in step S615, then it is determined in step S620 whether an invalid line is present in the congruence set. If an affirmative determination is made, then the process proceeds to step S635, where the invalid line is selected, and the process moves to step S650. If a negative determination is made, then the process proceeds to step S625.

In step S625, first, a determination is made for the individual transaction flag values in the congruence set as to whether there is a line of which the bit of a corresponding transaction bit vector is 1. If an affirmative determination is made, then the process proceeds to step S630. If a negative determination is made, then the process moves to step S640. In step S630, the LRU line is selected as a victim candidate from lines of which the bits of the transaction bit vectors are 1 (that is, lines registered as victim candidates) and the process proceeds to step S645. In step S640, a victim candidate is selected using the normal LRU algorithm. The process proceeds to step S645, where if the transaction flag value of the victim candidate is not zero, a corresponding counter is decreased by 1, and the process proceeds to step S650.

In step S650, requested data is fetched from a main memory to the selected line. At that time, write-back is performed if necessary. The process proceeds to step S655, where the value T is stored as a transaction flag value in the line to which the data is fetched. Then, if the value T is not zero (an instruction for transient cache access or prefetch) in step S660, the corresponding counter is increased by 1. The process then proceeds to step S665. In step S665, the LRU management information 330 in the congruence set is updated.

According to still another embodiment of the present invention, a computer program product is provided for controlling cache. The computer program product includes computer program instructions stored on a computer readable storage medium. When the instructions are executed, a computer will perform the steps of the method for controlling cache, the steps of which are described above.

As will be appreciated by those skilled in the art, aspects of the present invention may be embodied as a system or method (as described above) or as a computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the present invention may take the form of a computer program product embodied in one or more computer readable medium(s) having computer readable program code embodied thereon.

A combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or a suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or a suitable combination of the foregoing. A computer readable storage medium may be a tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms, including, but not limited to, electro-magnetic, optical, or a suitable combination thereof. A computer readable signal medium may be a computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or a suitable combination of the foregoing.

Computer program code for carrying out operations for aspects of the present invention may be written in one programming language or in a combination of two or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Thus, according to the embodiments of the present invention, because the cache is used efficiently in accordance with the characteristics of transactions processed by the application, the performance of the application server is improved. Furthermore, because transactions can be classified depending on the kind of an HTTP request from the client, transaction flag values can be used more efficiently.

What is claimed is:

1. A computer-implemented method for controlling a cache, said method comprising the steps of:
    assigning a value corresponding to a transaction to a memory object that is created while a computer application is processing said transaction;
    adding said assigned value as a transaction flag value to a flag area of a cache array in accordance with the storage of said memory object in said cache;
    registering said corresponding transaction flag value as a victim candidate at the completion of said transaction; and
    preferentially evicting a cache line having said transaction flag value registered as said victim candidate, wherein said step of preferentially evicting a cache line having said transaction flag value registered as said victim candidate is in response to an eviction of a cache line;
    wherein said cache further includes one bit vector whose length corresponds to the number of values that said transaction flag value can take;
    said step of registering said corresponding transaction flag value as a victim candidate comprises setting a bit, in said bit vector, corresponding to said transaction flag value to 1; and
    said cache further includes counters corresponding to the individual bits of said bit vector, wherein each said counter indicates the number of valid lines in said cache array.

2. The method according to claim 1, wherein
    said transaction is generated in response to a hypertext transfer protocol (HTTP) request from a client; and
    in said step of assigning a value corresponding to a transaction, said computer application assigns the same value to transactions having the same combination of the uniform resource identifier (URI) of the HTTP request and a method thereof.

3. A computer-implemented apparatus for controlling a cache, said apparatus comprising:
    a processing device configured to:
    assign a value corresponding to a transaction to a memory object that is created while a computer application is processing said transaction;
    add said assigned value as a transaction flag value to a flag area of a cache array in accordance with the storage of said memory object in said cache;
    register said corresponding transaction flag value as a victim candidate at the completion of said transaction; and
    preferentially evict a cache line having the transaction flag value registered as the victim candidate, wherein preferentially evicting a cache line having said transaction flag value registered as said victim candidate is in response to an eviction of a cache line;
    wherein said cache further includes one bit vector whose length corresponds to the number of values that said transaction flag value can take; and
    said registering unit comprises a bit setting unit for setting a bit, in said bit vector, corresponding to said transaction flag value to 1; and
    said cache further includes counters corresponding to the individual bits of said bit vector, wherein each said counter indicates the number of valid lines in said cache array.

4. The apparatus according to claim 3, wherein
said transaction is generated in response to a hypertext transfer protocol (HTTP) request from a client; and
the processing device assigns the same value to transactions having the same combination of the uniform resource identifier (URI) of the HTTP request and a method thereof.

5. A non-transitory computer readable storage medium for controlling a cache, said computer readable storage medium comprising computer program instructions for carrying out the steps of:
assigning a value corresponding to a transaction to a memory object that is created while a computer application is processing said transaction;
adding said assigned value as a transaction flag value to a flag area of a cache array in accordance with the storage of said memory object in said cache;
registering said corresponding transaction flag value as a victim candidate at the completion of said transaction; and
preferentially evicting a cache line having said transaction flag value registered as said victim candidate, wherein said step of preferentially evicting a cache line having said transaction flag value registered as said victim candidate is in response to an eviction of a cache line; wherein
said cache further includes one bit vector whose length corresponds to the number of values that said transaction flag value can take;
said step of registering said corresponding transaction flag value as a victim candidate comprises setting a bit, in said bit vector, corresponding to said transaction flag value to 1; and
said cache further includes counters corresponding to the individual bits of said bit vector, wherein each said counter indicates the number of valid lines in said cache array.

6. The computer readable storage medium according to claim 5, wherein
said transaction is generated in response to a hypertext transfer protocol (HTTP) request from a client; and
in said step of assigning a value corresponding to a transaction, said computer application assigns the same value to transactions having the same combination of the uniform resource identifier (URI) of the HTTP request and a method thereof.

* * * * *